H. C. MILLER.
LOCKING DEVICE FOR STEERING WHEELS.
APPLICATION FILED JUNE 18, 1921.
1,428,649.
Patented Sept. 12, 1922.
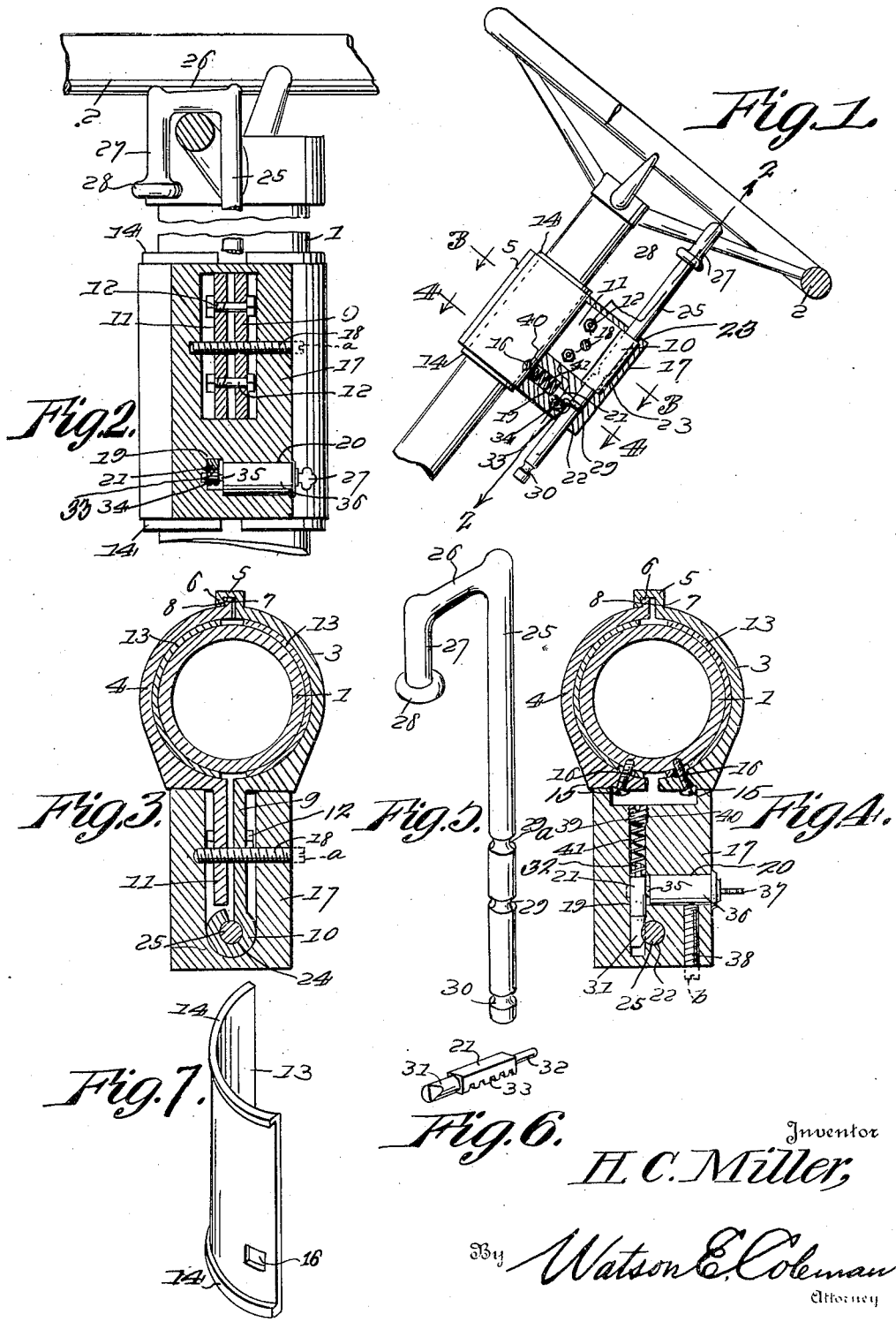

Patented Sept. 12, 1922.

1,428,649

UNITED STATES PATENT OFFICE.

HIRAM C. MILLER, OF PARKESBURG, PENNSYLVANIA.

LOCKING DEVICE FOR STEERING WHEELS.

Application filed June 18, 1921. Serial No. 478,705.

*To all whom it may concern:*

Be it known that I, HIRAM C. MILLER, a citizen of the United States, residing at Parkesburg, in the county of Chester and State of Pennsylvania, have invented certain new and useful Improvements in Locking Devices for Steering Wheels, of which the following is a specification, reference being had to the accompanying drawings.

The present invention has for its purpose to provide a locking device of this general character, to prevent unauthorized manipulation of the steering wheel of an automobile, and primarily to improve, simplify, and render more efficient and practical the locking devices disclosed in the Patent No. 1,346,837, issued to Hiram C. Miller on July 20, 1920, and in the application filed November 8, 1920, Serial No. 422,595.

Another purpose is to eliminate the opposing jaws (which engage above and below the spoke of the steering wheel) in the aforesaid copending application.

Another purpose is to provide a pair of clamps to engage about the steering column in a manner similar to those in said copending application, in combination with a locking casing fitting over opposed parts of said clamps, in combination with a locking device or element passing down through one of said opposed parts and through the casing and provided with a hook engaged over one of the spokes of the steering wheel, with means for locking the casing in place and holding the locking device in engagement with the spoke of the wheel.

Still another purpose is the provision of means for preventing movement of the clamps on the steering column, with spacing fillers substantially semi-circular in shape, whereby the clamping members may be adapted to fit columns of different diameters.

A further purpose is the provision of a locking device of this character, wherein the locking element may be locked in engagement with the spoke of the steering wheel, or locked in a position partly withdrawn from the locking means, and held out of engagement with the spoke of the steering wheel.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in side elevation of a portion of the steering column and the steering wheel, showing the locking device applied, with the casing 17 in section.

Figure 2 is a sectional view on line 2—2 of Figure 1.

Figure 3 is a cross sectional view on line 3—3 of Figure 1.

Figure 4 is a cross sectional view on line 4—4 of Figure 1.

Figure 5 is an enlarged detail view of the locking element 25.

Figure 6 is a detail perspective view of the locking bolt 21.

Figure 7 is a detail perspective view of one of the fillers 13.

Referring to the drawings, 1 designates a conventional form of steering column, on which the usual steering wheel 2 is mounted. Clamps 3 and 4 are provided, which are substantially semi-circular in cross section. The clamp 3 is provided with an overlying hook shaped flange 5, which is angular in cross section, to overlie the flange 6 at a corresponding end of the clamp 4. The flange 6 has a bevel wall 7, which is engaged by a corresponding wall 8 of the overlying part of the flange 5, thereby locking the corresponding ends of the clamps 3 and 4 together.

The clamp 3 at its other end terminates in a laterally extending flange 9 which merges into a cylindrical sleeve 10. The clamp 4 at its end opposite the flange 6 is provided with a lateral flange 11, which corresponds to and opposes the flange 9. This flange 11 is interposed between the column and the cylindrical sleeve 10, there being suitable bolts 12 passing through the flanges 9 and 11, to insure holding the clamps 3 and 4 on the column.

The clamps 3 and 4 are constructed to correspond to and fit steering columns of maximum diameters, there being fillers 13, which are semi-circular in cross section, and to be employed between the clamps 3 and 4 and the column, so that the clamps 3 and 4 may be mounted upon steering columns of smaller diameters. The upper and lower ends of the fillers 13 have lateral flanges 14, between which the clamps 3 and 4 engage, thereby preventing movement of the clamps relatively to the fillers. Screws 15 extend through the clamps 3 and 4 and through openings 16 (which are elongated) of the fillers and into the steering column 1, thereby not only preventing axial movement of the clamps, but also preventing axial movement of the fillers, and since the clamps are located between the flanges 14, movement of the clamps 3 and 4 and the fillers relatively to the steering column is prevented.

A casing 17 is provided, and its upper portion is hollow, or U-shaped in cross section, so as to straddle the flanges 9 and 11, and also the cylindrical sleeve 10. A suitable screw 18 passes through the wall of the casing 17 and engages into the flanges 9 and 11, thereby attaching the casing to the clamps, and insuring the prevention of the detachment of the casing, and the locking element to be entirely withdrawn. The screw 18 when applied is constructed long enough to leave a part of the screw extended, as shown in dotted lines at $a$, so that after the screw has been driven home the extended part (which is shown in dotted lines at $a$ and provided with the screw driver engaging kerf) is cut off flush with the side of the casing. The side of the casing is then machined and dressed off so as to render the location of the screw invisible, as much as possible, and after which the casing may be nickel-plated, which will render the location of the screw absolutely invisible. In this way the casing is fastened in place, so that it cannot be removed. While the screw 18 is used for fastening the cover 17 on the flange 9 and 11, it is obvious that the screw may be eliminated, thereby depending entirely upon the locking element. However in this instance should the locking element be entirely withdrawn, it is possible to detach the casing, thereby depending entirely upon the locking element for fastening the casing to the clamps, it may be stated that the locking element performs three functions, namely fastening the element to the flanges 9 and 11 of the clamps, as well as preventing the steering wheel from turning, and also locking the casing 17 to the flanges 9 and 11 of the clamps. The casing also covers the screw 15, thereby preventing access thereto, thereby preventing the clamps from being removed, as well as the casing.

The lower part of the casing 17 is substantially solid, with the exception of the bores 19 and 20, the former of which is rectangular in cross section, for the reception of a sliding bolt 21, which is also rectangular in cross section, or otherwise shaped correspondingly with the bore 19, so as to prevent turning of the bolt. The lower solid portion of the casing 17 also has an opening 22, which registers with an opening 23 of the upper wall of the casing 17. These two openings 22 and 23 register axially with the opening or passage 24 through the sleeve 10, to permit of the reception of a steering wheel locking element 25. This locking element 25 comprises an elongated rod preferably cylindrical and is provided at its upper end with a lateral arm 26, which terminates in an extension 27 provided with a knob 28 at its extremity. The extension 27 lies parallel with the elongated rod, while the lateral portion 26 is designed to overlie one of the spokes of the steering wheel, so that when the rod 25 is lowered and locked in the casing 17 with the lateral portion overlying the spoke of the steering wheel, the manipulation of the steering wheel is prevented. When the locking element 25 is released or unlocked, it may be raised sufficiently to dispose the knob 28 on a plane above the plane of the spokes, then the locking element may be locked in such raised position, hence permitting the steering wheel to be rotated as may be found desired, for steering the front wheels of the automobile.

The lower part of the rod or locking element 25 is provided with a pair of spaced angular grooves 29 and 30, the latter of which is in a position close to the extremity of the rod or locking element, while the former is spaced from the latter a distance, substantially equal to that of the raising movement of the locking element to permit the knob or head 28 to be positioned above the spokes of the steering wheel.

While the body portion of the locking bolt 21 is rectangular in cross section to prevent it from turning, its end portion 31 is cylindrical, so is the end 32 of the bore 19, with which the end portion 31 of the locking bolt engages. The cylindrical portion 32 of the bore 19 is concentric with the arcuate contour of each of the grooves 29 and 30, so that when the locking bolt is moved to a locking position, its cylindrical end 31 will engage one of the annular grooves of the locking element, thereby preventing withdrawing the element from the casing. When the locking element is unlocked, it may be raised until the groove 30 registers with the cylindrical part 32 of the bore 19. The sliding bolt 21 may then be moved until its end 31 may engage the groove 30, which will prevent lowering the locking element as well as preventing it from being withdrawn entirely. Obviously when the locking element or rod 25 is lowered, the cylindrical end 31 of the locking bolt may engage the groove 29, and thereby retain the locking element or rod in a lowered position, with its lateral part 26 overlying the spoke of the steering wheel. If desired the locking element or rod 25, when unlocked and raised sufficiently to permit the knob 28 to escape the spoke of the steering wheel, the rod or locking element may be rotated, and then lowered back into the casing 17, in which case the lateral part 26 of the locking element or rod will assume a position below the spokes of the steering wheel, permitting the steering wheel to freely rotate, for the purpose of steering the automobile.

The rectangular body portion of the locking bolt is provided with rack teeth 33 which are engaged by the teeth of the pinion or gear 34. This pinion is carried by a rotating shaft 35, which extends through the end wall of the barrel of a "Corbin" or "Yale" lock 36, so that when the inner mechanism (not shown) of this conventional form of lock 36 is operated by the usual key 37, the pinion or gear 34 may be rotated for the purpose of shifting the locking bolt 21 in its bore, to withdraw the cylindrical end 31 of the bolt from engagement with either one of the grooves. The idea of the "Yale" or "Corbin" lock and a manner of using the same is disclosed in said copending application. The cylinder or barrel of this "Corbin" or "Yale" lock is fitted closely in the bore 20 of the casing 17, there being a screw 38 engaging through the casing 17 and into the barrel or cylinder of the lock, to prevent removal of the same. When originally applying the screw 38, in fact when constructing the entire device, it is made long enough to afford an extension shown in dotted lines at $b$, and which extension is cut off, and the screw made flush with the outer surface of the casing, in order to render its locations practically invisible. However after machining or otherwise dressing the face of the casing, and nickel-plating it in the usual manner, the location of the screw 38 is rendered entirely invisible. In this way the "Corbin" or "Yale" lock is secured removably in the casing 17.

The bore 19 is formed in the casing 17 in a direction toward the steering column, and the end of the bore nearest the steering column is provided with internal threads 39, to receive a screw plug 40. This threaded portion of the bore 19 is larger in diameter than the rectangular portion of the bore 19, and interposed between the screw plug and one end of the locking bolt 21 a coil spring 41 is arranged. This coil spring holds the bolt normally with its cylindrical end engaging either one of the grooves 29 and 30. However when the "Yale" or "Corbin" lock is manipulated, the pinion 34 moves the bolt against the tension of the spring 41, allowing the cylindrical end 31 of the bolt to disengage one or the other of said grooves, which will permit adjustment of the locking element or rod 25. The reduced extension 32 is engaged with the coil spring 41, to hold the spring centrally located. Any other suitable means may be afforded for mounting the bolt 21, while the bore 19 may be otherwise constructed. Also any other suitable means may be used for retaining the coil spring 41 in place, as well as providing any other suitable means for preventing the bolt from rotating, other than the rectangular formation of the bore. These features are obvious details, and may be varied as may be found convenient, in order to afford a device of the best commercial value.

The locking element 25 is provided with an additional groove $29^a$ above the groove 29, so that when the locking element is lowered with its part 26, below the spoke, the locking bolt 21 may be shifted, so that its end 31 may engage the groove $29^a$, to lock the locking element 25 in its extreme lowered position, with the parts 26 and 27 out of engagement with the spoke of the steering wheel.

The clamps 3 and 4 may be made in several sizes if desired, while the fillers are used to accommodate intermediate sizes of steering columns, for instance to be used to fit between a $1\frac{1}{4}$ inch diameter of steering column and clamps of 2 inches in diameter, and to fit between a column of $1\frac{1}{2}$ inches in diameter and clamps of $1\frac{3}{4}$ inches in diameter, and also to fit between the surface of a column of $1\frac{1}{4}$ inches in diameter and clamps of $1\frac{1}{2}$ inches in diameter. In fact these clamps and fillers may be made of any size whatever to fulfill the requirements.

Also it will be noted that the casing 17 fits against flat faces of the clamps 3 and 4, in order to insure strength and rigidity.

Though it has been stated that the screw 18 may be cut off after having been applied home, so as to render the location of the screw invisible, it is to be further understood that the screw acts to hold the casing steady and to prevent it from rattling and from falling off should the locking element or rod be entirely pulled out, therefore, if desired the screw may be made long enough to engage within the casing, so that its end shown in dotted lines at $a$ may be flush with the surface of the casing and not need to be cut off.

Also the pin or screw 38 need not have its end cut off, as previously stated, due to the fact that it may engage through the casing from its inner wall, that is from the face of the casing adjacent where the casing engages the clamps. In this instance the screw can be covered up, thereby preventing access thereto.

While an extra groove 30 is shown at the lower end of the locking element, it is obvious that this groove may be eliminated if desired, and the element cut off at its lower end flush with the under surface of the casing 17, for it is only necesary to lock the locking element in a locked position with the spoke of the wheel, or in an unlocked position with its upper hooked end below and out of engagement with one the spokes.

It will be noted that when the wheel is locked the hooked end of the rod is in engagement with one of the spokes, and should an unauthorized person attempt to saw the spoke of the wheel, so that the wheel can be turned, the unauthorized person will be unable to steer the wheel. due to the fact that the locking element will still project upwardly in the path of the remaining spokes, thereby preventing the unauthorized person from steering the automobile, through the streets and the traffic. Obviously should the unauthorized person saw off every spoke in the wheel, then of course there would be no steering wheel, hence an attempt to appropriate the automobile would be unsuccessful.

The invention having been set forth, what is claimed as being useful is:

1. The combination with a steering column having a steering wheel, of a pair of clamps having portions concentric with said column, fillers between said portions and the column, a casing enclosing corresponding ends of said clamps, means securing said corresponding ends of said clamps together, means passing through the casing and said corresponding ends, the extremity of one of said corresponding ends having a sleeve, a locking element passing through said casing and through the sleeve and being operatively connected to one of the spokes of the steering wheel, and means in the casing operatively connected with the element for locking the same therein.

2. The combination with a steering column having a steering wheel, of a pair of clamps having portions concentric with said column, fillers between said portions and the column a casing enclosing corresponding ends of said clamps, means securing said corresponding ends of said clamps together, means passing through the casing and said corresponding ends, the extremity of one of said corresponding ends having a sleeve, a locking element passing through said casing and through the sleeve and being operatively connected to one of the spokes of the steering wheel, means in the casing for locking the element in and out of operative connection with the steering wheel, and means obscured by the casing passing through parts of the clamps and through the fillers for securing the clamps and the fillers to the steering column.

3. The combination with a steering column having a steering wheel, of a locking element assuming a position parallel with and spaced from the column and being operatively connected with one of the spokes of the steering wheel, a pair of clamps fixedly secured to the column and having corresponding reduced end portions, means to secure together said end portions, one of which being provided with a sleeve, a casing entirely housing said end portions and having a passage registering with the interior of the sleeve for the reception of and holding said element in spaced parallelism to the column, whereby the element may be moved longitudinally through the sleeve, to engage and disengage it with the spoke of the steering wheel, said element having a plurality of bolt receiving means, and a spring tensioned bolt in the casing and adapted to operatively enter any one of said bolt receiving means of the element, to hold it in and out of operative connection with the spoke of the steering wheel.

4. The combination with a steering column having a steering wheel, of a locking element assuming a position parallel with and spaced from the column and being operatively connected with one of the spokes of the steering wheel, a pair of clamps fixedly secured to the column and having corresponding reduced end portions, means to secure together said end portions, one of which being provided with a sleeve, a casing entirely housing said end portions and having a passage registering with the interior of the sleeve for the reception of and holding said element in spaced parallelism to the column, whereby the element may be moved longitudinally through the sleeve, to engage and disengage it with the spoke of the steering wheel, said element having a plurality of bolt receiving means, and a spring tensioned bolt in the casing and adapted to operatively enter any one of said bolt receiving means of the element, to hold it in and out of operative connection with the spoke of the steering wheel, and means in the casing for operating said spring tensioned bolt.

5. The combination with a steering column having a steering wheel, of a locking element assuming a position parallel with and spaced from the column and being operatively connected with one of the spokes of the steering wheel, a pair of clamps fixedly secured to the column and having corresponding reduced end portions, means to secure together said end portions, one of which being provided with a sleeve, a casing entirely housing said end portions and having a passage registering with the interior of the sleeve for the reception of and holding said element in spaced parallelism to the column, whereby the element may be moved longitudinally through the sleeve, to engage and disengage it with the spoke of the steering wheel, said element having a plurality of bolt receiving means, and a spring tensioned bolt in the casing and adapted to operatively enter any one of said bolt receiving means of the element, to hold it in and out of operative connection with the spoke of the steering wheel, fillers between the clamps and the column and provided with flanges at their opposite ends overlying the clamps, and means for fastening the fillers to the clamps.

In testimony whereof I hereunto affix my signature.

HIRAM C. MILLER.